United States Patent
del Re et al.

[11] Patent Number: 5,927,416
[45] Date of Patent: Jul. 27, 1999

[54] METHOD FOR OPERATING A NON-RAILBORNE HYBRID VEHICLE

[75] Inventors: Luigi del Re, Solothurn; Gianni Francescutto, Biel; Patrick Theurillat, Yverdon-les-Bains; Robert Apter, Biel, all of Switzerland

[73] Assignee: SMH Management Services AG, Biel, Switzerland

[21] Appl. No.: 08/933,247

[22] Filed: Sep. 18, 1997

[30] Foreign Application Priority Data

Sep. 18, 1996 [EP] European Pat. Off. ............. 96114943

[51] Int. Cl.⁶ ........................................... B60K 1/00
[52] U.S. Cl. ................... 180/65.2; 180/65.3; 180/65.4
[58] Field of Search ................... 180/65.2, 65.3, 180/65.4; 318/143; 290/40 R

[56] References Cited

U.S. PATENT DOCUMENTS

| | | | |
|---|---|---|---|
| 4,305,254 | 12/1981 | Kawakatsu et al. | 60/716 |
| 4,407,132 | 10/1983 | Kawakatsu et al. | 60/716 |
| 5,336,932 | 8/1994 | Barske | 290/1 R |
| 5,402,046 | 3/1995 | Jeanneret | 318/139 |
| 5,461,289 | 10/1995 | Adler et al. | 318/139 |
| 5,515,937 | 5/1996 | Adler et al. | 180/65.2 |
| 5,588,498 | 12/1996 | Kitada | 180/65.4 |
| 5,589,743 | 12/1996 | King | 318/139 |
| 5,632,352 | 5/1997 | Jeanneret et al. | |
| 5,775,449 | 7/1998 | Moroto et al. | 180/65.2 |
| 5,786,640 | 7/1998 | Sakai et al. | 180/65.2 |
| 5,788,004 | 8/1998 | Friedmann et al. | 180/65.2 |

FOREIGN PATENT DOCUMENTS

| | | |
|---|---|---|
| 0 556 942 A1 | 2/1993 | European Pat. Off. . |
| 41 33 013 A1 | 4/1993 | Germany . |
| 41 33 059 A1 | 4/1993 | Germany . |
| WO 92/13380 | 8/1992 | WIPO . |
| WO 95/13201 | 5/1995 | WIPO . |

*Primary Examiner*—J. J. Swann
*Assistant Examiner*—David R. Dunn
*Attorney, Agent, or Firm*—Pollock, Vande Sande & Amernick, R.L.L.P.

[57] ABSTRACT

A hybrid vehicle and operating method, wherein, given a pending change in the rotational speed of a combustion engine of the hybrid vehicle, provides for a battery, independently of the power to be transmitted to the driving wheels, to be so charged or discharged in a directed manner that the change in rotational speed is effected as swiftly as possible. With regard to fuel consumption, pollutant emission and/or care of the engine, optimal operating points are passed through. On the one hand in the case of a pending increase in power of the combustion engine, it is provided for the battery to be more heavily discharged or less heavily charged according to the initial situation, and in the case of a pending reduction in power, to be more heavily charged or less heavily discharged.

10 Claims, 4 Drawing Sheets

METHOD FOR OPERATING A NON-RAILBORNE HYBRID VEHICLE

BACKGROUND OF THE INVENTION

The invention relates to a method for operating a non-railborne hybrid vehicle having means for changing an operating state of its internal combustion engine.

The solution shown in the publication document EP 0 556 942 relates to a non-railborne series hybrid vehicle with a combustion engine, a generator coupled to its crankshaft, power electronics, an electronic control as well as at least one electric drive motor.

Since the vehicle user generally expects an acceleration of the vehicle when he presses the gas pedal more heavily, there is required an undelayed, monotonic increase in the driving torque without the occurrence of tractive force, and a corresponding monotonic increase of the generator torque (column 5, lines 33 to 41).

Given this condition, the driving and generator power likewise increase monotonically due to the physical relationship power equals torque multiplied by the rotational speed (column 5, lines 8 to 15 as well as 42 to 49).

In EP 0 556 942 then, for the mentioned case of a pending increase in power of the combustion engine, it is suggested at first not to increase to torque absorbed by the generator to the degree which is the case with the torque produced internally in the combustion engine (column 5, lines 15 to 21).

The excess power of the combustion engine arising from this has the effect that its rotational speed may increase more swiftly and that the nominal power is available as soon as possible (column 5, lines 22 to 29).

The disadvantage of this solution however lies in the fact that a quicker increase in rotational speed of the combustion engine is by matter of course achieved at the cost of vehicle acceleration. Both criteria "a quick increase in rotational speed" as well as "an immediate increase in the driving power" restrict one another.

In an extreme case, although a swift increase in rotational speed and thus a quick attainment of the aimed power of the combustion engine is made possible, during this acceleration interval however, there is at the most only a slight acceleration of the vehicle possible. The desired acceleration of the vehicle occurs delayed only on reaching the nominal rotational speed.

Reversely, a direct acceleration of the vehicle has the result that the rotational speed of the combustion engine increases only slowly and the final driving power sought after is only gradually achieved. Due to the fact that the generator in this case heavily loads the combustion engine, narrow limits are set for the choice of optimal operating points in the torque-speed characteristic curve. For example, in this manner, during the acceleration phase, a minimal fuel consumption can hardly be achieved.

In the case of a foreseen reduction in power of the combustion engine, the torque absorbed by the generator, in contrast to the previously described case, is always kept greater that the torque produced by the combustion engine. Analogously, here the generator power reduces monotonically until the new operating point of the combustion engine has been reached (column 5, line 50 to 58, and column 6 lines 1 to 6). It is however not mentioned as to what happens with the excess generator power during such a change in operating point.

BRIEF SUMMARY OF THE INVENTION

It is therefore the object of the invention to find a method for changing the operating state of a combustion engine of a hybrid vehicle, which during a transition period, preceding from an actual operating state and graduating into a nominal operating state, independently of the power to be transmitted to the at least one driving wheel, permits a rapid adaptation of the rotational speed with optimal operating conditions.

The solution to the object according to the invention is to be deduced from the features described below.

Preferred embodiment forms are specified in the dependent claims.

The operating method according to the invention ensures, during changes in operating state of the combustion engine, by way of a directed application of an energy storer, a complete decoupling of the driving wheels from the combustion engine with regard to power, by which means on the one hand, a direct, effective increase or reduction of the desired vehicle power, i.e. the power transmitted to the driving wheels, and on the other hand, a rapid increase or reduction of the rotational speed with optimal operating conditions of the combustion engine is made possible.

By way of this decoupling, the combustion engine may also be driven during a change in operating state, i.e. during an increase or reduction in rotational speed, and in particular may be optimally driven with regard to energy consumption, emission of pollutants, noise formation and/or care of the engine. For the sake of simplicity, instead of optimal energy consumption, emission of pollutants, noise formation and/or care of the engine, optimal operating conditions will be referred to.

More exact details and explanations for this are cited hereinafter.

The solution according to the invention is equally advantageous for various types of hybrid vehicles and in particular for series and parallel hybrid vehicles as well as combination types. Likewise, as a thermal energy source, which here is indicated with a combustion engine, principally for example there may be applied a diesel or petrol engine with a throttle valve or fuel injection, a gas turbine, a fuel cell etc.

In the following and purely by way of example, various series and parallel vehicles are described with which the inventive solution may be applied :

A series hybrid vehicle basically comprises a combustion engine, also called a thermal motor or internal combustion engine, a generator coupled to its crankshaft, one or more electrical drive motors which for example act directly as wheel hub motors, and together with the combustion engine, a battery as a second energy source. In the state of the art the battery is applied merely as a constant load energy source, i.e. in continuous operation for supplying the electric drive motors, as is deduced from EP 0 545 390, but not as a means to temporarily relieve to combustion engine with a change in operating state.

In contrast to the series hybrid vehicle, a parallel hybrid vehicle comprises a direct mechanical connection, for example consisting of a gear, clutch and differential gear, between the combustion engine and the driving wheels, as occurs with most conventional automobiles. Parallel to this mechanical driving line, a battery is in electrical connection with electric drive motors which likewise act on the driving wheels. According to WO 91/08123 the combustion engine may act on the front axle, whilst an electric drive motor is only connected to the rear axle. There have also been published variants with which no direct mechanical coupling of the electric drive motors to the driving wheels or axles is provided, as for example EP 0 584 090 shows, but a coupling between the combustion engine and gear or between the gear and the differential gear.

Of course hybrid vehicles further comprise control and regulating circuits, as for example a motor control which in the case of a diesel motor, depending on the gas pedal position, on the rotational speed, on the driving speed, on the temperature of fuel, on the temperature of the intake air and cooling fluid, on the suction tube pressure etc., determines the injection quantity, the injection timing, the exhaust gas recirculation etc. Furthermore there is mostly a so-called vehicle management unit present which has at its disposal motor data, information on the charged condition of the battery, on the vehicle in general, on the voltage produced by the generator in the case of a series hybrid vehicle, and which controls and monitors the working together of the combustion engine, the electrical machines, the battery etc. Of course the motor control may be an integral component of the vehicle management unit.

Additional to this there is the drive circuit for the electrical drive motors which converts the energy coming from the battery, and in the case of a series hybrid vehicle, additionally the energy of the generator, and which guides this energy to the drive motors. With this, it may be the case of a DC/AC converter.

There is further provided a battery charging circuit which controls the charging or discharging current, taking into account the charged condition of the battery. Battery charging circuits and battery control methods are already known in large numbers and most may be employed for the inventive method. Basically it is also possible instead of batteries, accumulators or ultra-capacitors to employ for example a mechanical flywheel with an electrical drive.

BRIEF DESCRIPTION OF THE DRAWINGS

The method according to the invention is hereinafter described purely by way of example referring to a series hybrid vehicle and by way of the drawings in which FIG. 4b is the torque-rotational speed graph to FIG. 4a.

DETAILED DESCRIPTION OF THE INVENTION

Figure 1:
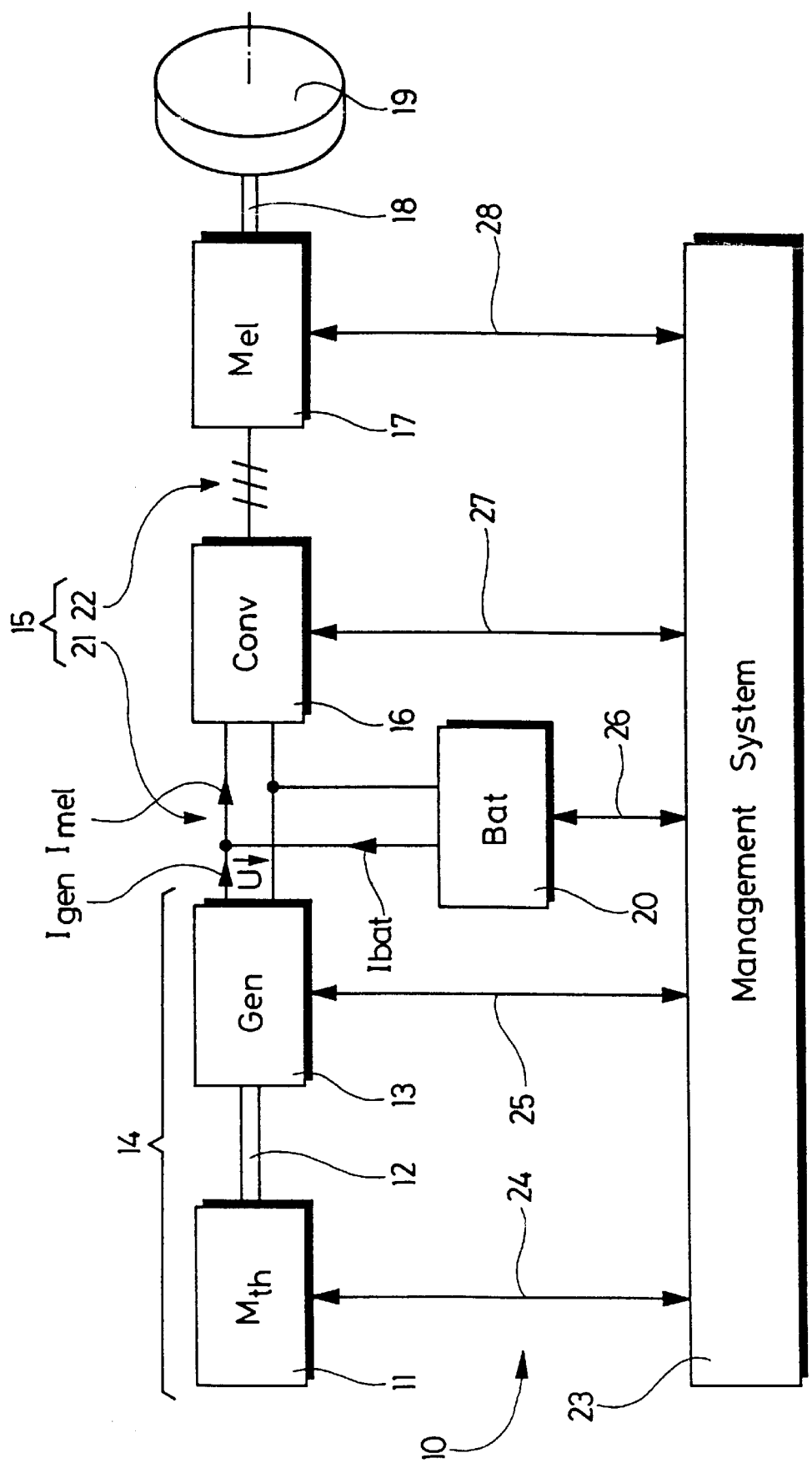
FIG. 1 is a block diagram of a drive unit of a series hybrid vehicle.

The drive unit 10 of a series hybrid vehicle represented in FIG. 1 shows a combustion engine (Mth) 11, onto whose crankshaft 12 there is possibly coupled, via a gear which is not shown, an electrical machine (Gen) 13 which can be operated as a generator. The combustion engine-generator unit consisting of the combustion engine 11 and the generator 13 is indicated at 14. Via an electrical connection 15 and a transducer 16 (conv) connected in series, the generator 13 is in energy-transmitting connection with at least one further electrical machine (Mel) 17 which can be operated as a motor and which for example in the form of an asynchronous machine absorbs the electrical power given out by the generator 13 and transmits it via a mechanical connection 18 to a driving wheel 19. This electrical machine 17 may function as a generator in the case of recuperation.

Additional to the generator 13, there is further an electrical energy storer 20 (Bat) which is in energy transmitting connection with the electrical motor 17 via the transducer 16. In FIG. 1 only one electrical motor 17 and driving wheel 19 is represented. An advantageous solution on the other hand is formed by wheel hub motors mounted in each case directly on several driving wheels.

Assuming that as an energy storer 20 chargeable batteries are provided, the part of the electrical connection 15 between the generator 13 and the transducer 16 is a direct-current connection 21 with a constant voltage U. At the same time the direct-current connection 21 comprises a node in which the three currents are led together, the current of the generator 13 indicated at Igen, that of the battery 20 indicated at Ibat, and that of the transducer indicated at Imel. The corresponding current direction arrows relate to the case in which the generator 13 as well as the battery 20 yield power to the transducer 16.

In the case of asynchronous drive motors 17, as a transducer, a DC/AC converter is provided. On the output side of the DC/AC converter 16 the electrical connection 15 is formed as a multiphase alternating current 22.

A vehicle management unit (MS) is indicated at 23 and via signal connections 24 to 28, is in contact with the combustion engine 11, the generator 13, the battery 20, the transducer 16 and the electrical motor 17. In the vehicle management system there may be integrated a motor control which controls the combustion engine 11 and a charging and discharging circuit for the battery. A considerable reduction in costs is achieved with this integration, particularly with hybrid cars.

Not shown for example are various operating units for the driver as well as the accompanying signal paths to the vehicle management unit 23. This concerns for example the gas pedal, brake pedal, operating mode selection unit for preselecting an economical or sports driving behaviour, etc.

Via the signal connection 24, for instance the rotational speed of the motor, the temperature of the fuel, of the intake air and of the cooling medium, the suction tube pressure, etc. is conveyed to the vehicle management unit 23 which for its part delivers corresponding parameters to the combustion engine 11 such as the injection quantity, ignition timing, etc.

The signal connection 25 permits for instance, for the case that the generator 13 is not permanent magnet energized, the control of the energizing field.

By way of the signal connection 26, the voltage U of the direct-current connection 21 and of the battery 20 is delivered to the vehicle management unit 23.

Via the signal connection 27, the current strength Imel is delivered to the vehicle management unit 23 and the transducer 16 is controlled.

The signal connection 28 gives information for example on the vehicle speed since the electric motor 17 is connected directly to a driving wheel 19.

The solution according to the invention is, as has already been mentioned, applicable to the most various of hybrid vehicles, in particular to the most varied types of drive units.

The examples of a power change of the combustion engine, shown in FIGS. 2a/2b, 3a/3b and 4a/4b and described hereinafter, relate accordingly only by way of example to the drive unit 10 shown in FIG. 1.

Figure 2A:
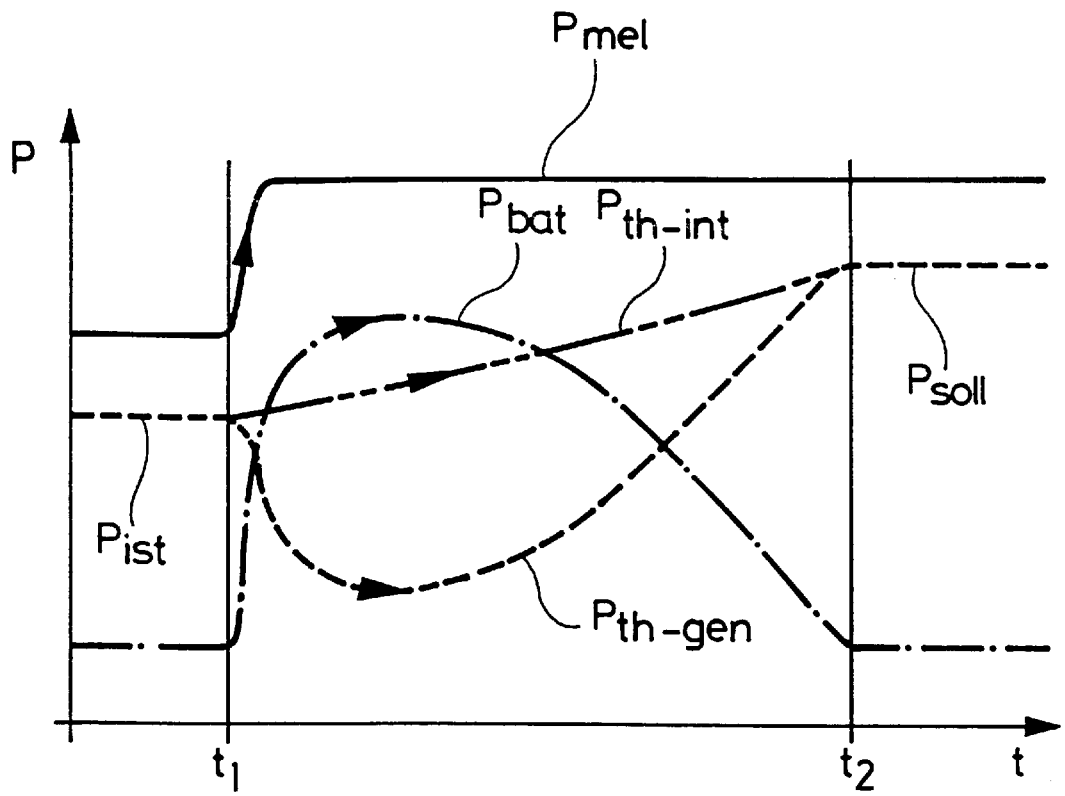
FIG. 2a is a power-time graph of a first example for the case of an increase in power or rotational speed of the combustion engine.

In FIG. 2a, as a first operating example, the chronological course of a power increase of the combustion engine, as may be required with an approaching vehicle acceleration or with an increasing gradient, is shown on a power-time graph (P/t graph).

In FIG. 2a there are shown four graphs
the course of the power Pmel demanded on the drive motors 17,
the course of the power Pth-int produced internally by the combustion engine,
the course of the power Pth-gen delivered to the generator 13 by the combustion engine 11 as well as
the course of the power Pbat delivered by the battery.

For the benefit of simplicity the losses of the combustion engine 11, the generator 13, the transducer 16, the battery 20 and the drive motors 17 are not taken into account. On the other hand essential for explaining the acceleration procedures is the difference between the power Pth-int produced internally by the combustion engine 11 and the actual power Pth-gen delivered to the generator 13 via the crankshaft.

Indicated at t1 is the point in time at which the gas pedal is increasingly pressed i.e. at which an increase in power is expected on the drive motors 17 and on the driving wheels 19.

Up to the point in time t1 there is assumed an operating situation in which a constant power Pmel is supplied to the electrical motors 17, and this power corresponding to the expectation of the driver or the gas pedal position at the time, which means that the combustion engine 11 before the point in time t1 is in equilibrium with respect to its power, i.e. the internally produced power Pth-int and the power Pth-gen delivered by the combustion engine to the generator 13 have the same value. This as mentioned is neglecting losses. This power value is called the actual power value and is indicated at Pist.

With this, according to FIG. 2a, purely by way of example a situation is assumed in which the battery 20 is applied as the energy supplier for the constant load, the major part of the power Pmel is however produced by the combustion engine 11. Thus the power sum consisting of the battery power Pbat and the generator power Pth-gen is supplied to the electrical motors 17.

At the point in time t1, the increase in power demanded via the gas pedal is registered by the vehicle management unit 23. Corresponding to different instructions from the driver's side, such as for instance a more economical or sporty running etc., to conditions specific to the vehicle such as the charged condition of the batteries etc, as well as to different stored data, these forming the basis for an optimal operation of the vehicle or combustion engine, there is defined a nominal operating point p2 of the combustion engine 11, see FIG. 2b, with an accompanying nominal power value Psoll, see FIG. 2a.

Figure 2B:
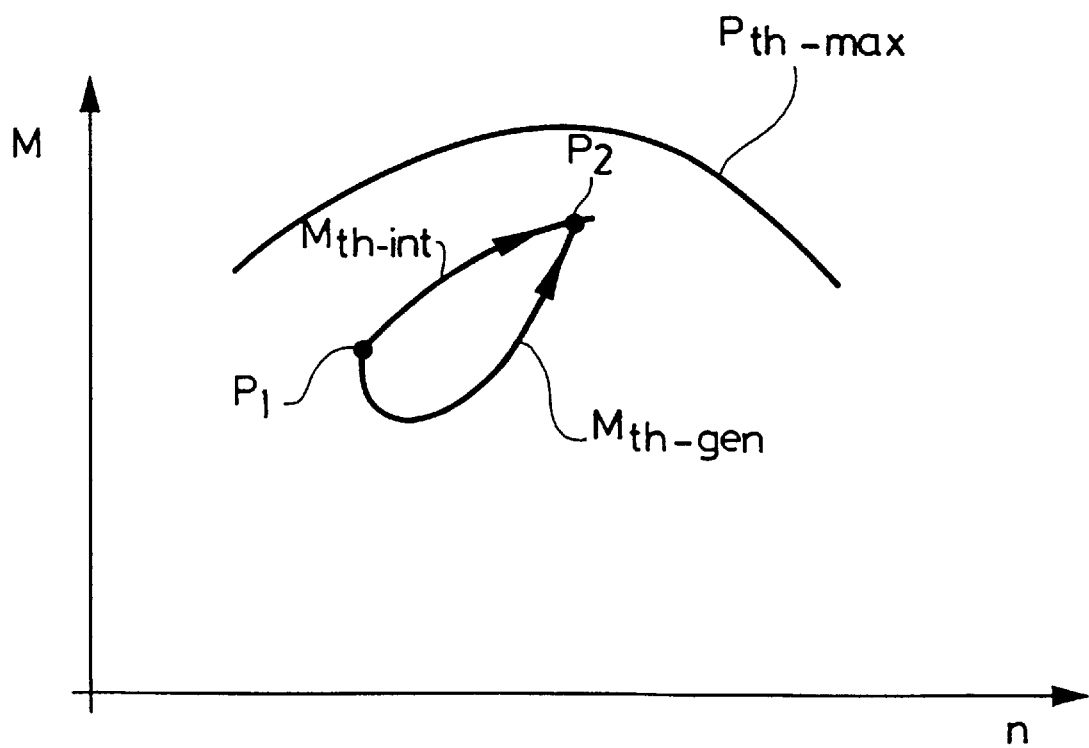
FIG. 2b is the torque-rotational speed graph to FIG. 2a, FIG. 3a is a power-time graph of a second example for the case of an increase in the power or rotational speed of the combustion engine.

According to FIG. 2b, which likewise only schematically shows the torque-rotational speed characteristics (M/n characteristics) the combustion engine 11 up to the point in time t1 is located at the operating point p1. The operating points p1 and p2 of course lie below the maximum power curve Pth-max of the combustion engine 11.

Then after the target operating point p2 is known, a certain path in the torque-rotational speed graph from p1 to p2 is fixed which fulfils certain demands. Such demands, as has already been mentioned, may be a rapid as possible increase in rotational speed, a minimal energy consumption, a minimal emission of pollutants, as small as possible noise formation or as great as possible care of the engine 11, or a corresponding combination or compromise.

For selecting a certain path in the torque-rotational speed characteristic curve of FIG. 2b the vehicle management unit 23 falls back on stored values which for example passes on command variables and sets of control parameters for various control units such as motor control or the unit for controlling the generator energizing field. These values may be integrated into the vehicle management unit 23 as has been mentioned previously. The motor control for example sets the throttle valve position of the combustion engine 11.

The drive unit 10 may be designed such that the vehicle management unit 23 only accesses the stored data and conveys the command variables and sets of control parameters to the various control units at the point in time t1. Afterwards the various control units operate autonomously but possibly coupled to one another until reaching the target operating point p2.

It may also be provided that the vehicle management unit 23 continuously calls up stored data in order to supply it to the control units in a converted form. In this respect characteristic curves stored for example in tabular form may be continuously called up. A combined form has been proven to be practical.

As can be deduced from FIG. 2a, the power Pmel supplied to the drive motors 17 from t1 increases almost directly to the desired value, i.e. the value corresponding to the position of the gas pedal, whilst the power Pth-gen delivered by the combustion engine 11 first clearly falls and then later increases again. Since the solution according to the invention provides for compensating this amount of lost power by way of the battery 20, the power Pbat delivered by the battery increases strongly and only again decreases with the increase of power Pth-gem, so that the power Pmel guided to the drive wheels 19 is already almost directly after tl, located at the nominal driving power value corresponding to the pedal position.

Analogously to this it can be deduced from FIG. 2b that the course of the torque Mth-int, internally produced in the combustion engine 11, from p1 to p2 lies above the course of the generator torque Mth-gen, i.e. that between p1 and p2 the torque Mth-int is always larger than the torque Mth-gen.

According to the curve Mth-int, the produced torque of the combustion engine 11 increases continuously with the rotational speed, whilst the course of the generator torque Mth-gen with an increasing rotational speed firstly sinks and then rises later. The resulting torque difference is used for the directed progress of the increase in rotational speed of the combustion engine/generator unit 14, again to the extent that during a change in operating state of the combustion engine, optimal operating conditions prevail.

At the point in time t2 the combustion engine 11 reaches the strived for target operating point p2. From here on, the engine is again in power equilibrium, i.e. Pth-int and Pth-gen have the same value.

It is specifically referred to the fact that the curve indicated at Pth-gen corresponds to the power delivered from the combustion engine 11 to the generator 13. The power Pth-int produced internally by combustion is between t1 and t2 higher than the power delivered so that an acceleration of the combustion engine 11 may be effected.

Of course the vehicle must not immediately comply with the instructions of the driver since a delay of half a second can hardly be perceived. This time interval may already be used for setting optimal operating conditions, i.e. for moving the operating point of the combustion engine 11, without the battery 20 already having to deliver additional power. This allows a gentle application of the battery, which is advantageous for its working life. For the sake of clarity however, an explicit representation of this delay is omitted in FIGS. 2a, 3a and 4a.

Hereinafter, for the second operating example shown in FIGS. 3a and 3b, as well as for the third operating example shown in FIGS. 4a and 4b, only the differences with regard to the first example and the corresponding FIGS. 2a and 2b are dealt with.

Figure 3A:
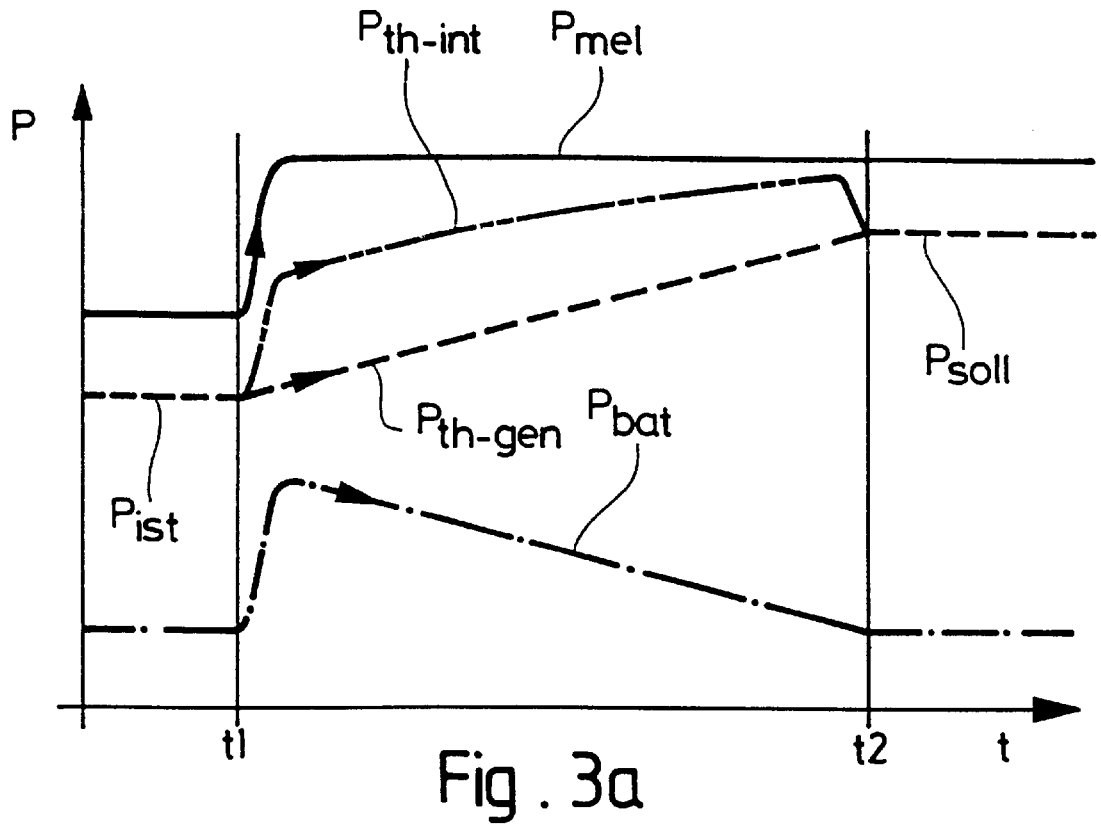
FIG. 3b is the torque-rotational speed graph to FIG. 3a, FIG. 4a is a power-time graph of a third example for the case of a reduction in power or rotational speed of the combustion engine.

In contrast to FIG. 2a, FIG. 3a shows an example of the method according to the invention in which the power Pth-gen delivered to the generator 13 does not fall at first but straight away rises monotonically. In such a case too, an energy delivery of the battery 20 may effect a more advantageous change in operating state of the combustion engine.

Figure 3B:
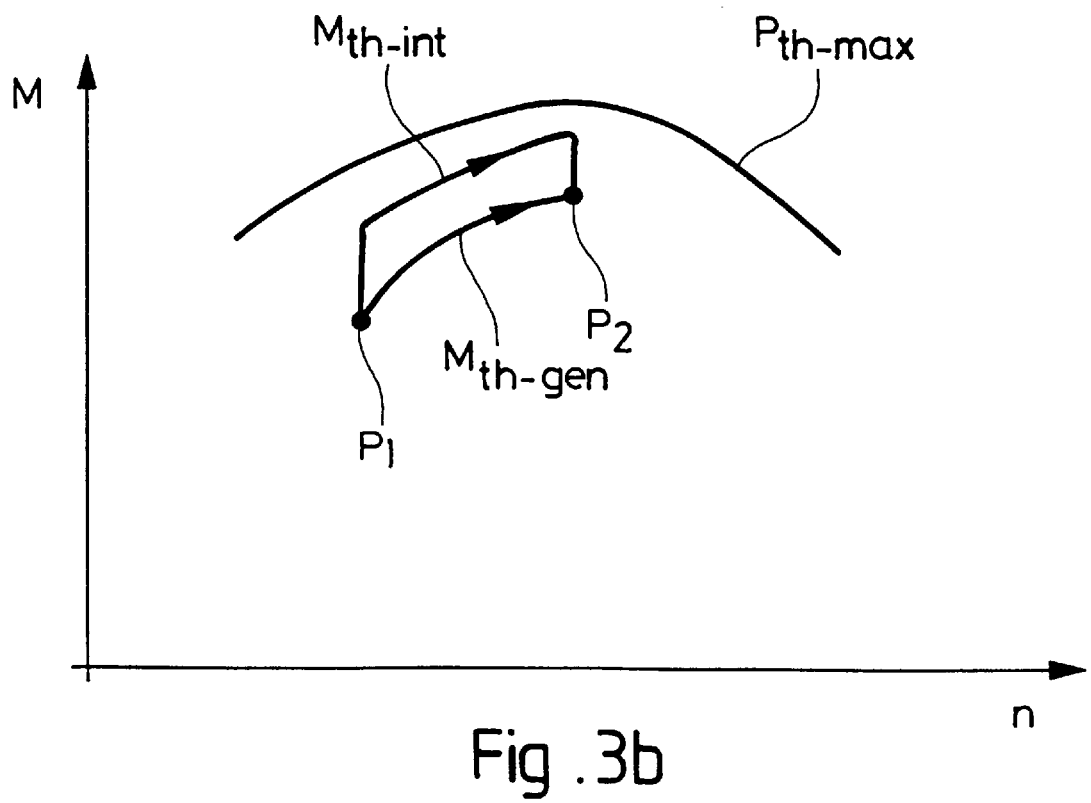

According to FIG. 3b in this case, the torque Mth-int produced by the combustion engine 11 and thus the corresponding power Pth-int may firstly increase quickly, for example by opening the throttle valve of an petrol engine. Afterwards the rotational speed, for example given a slight increase in power, is continuously increased, and subsequently the torque Mth-int and thus the power Pth-int again reduced, i.e. the opening of the throttle valve is again reduced.

Figure 4A:
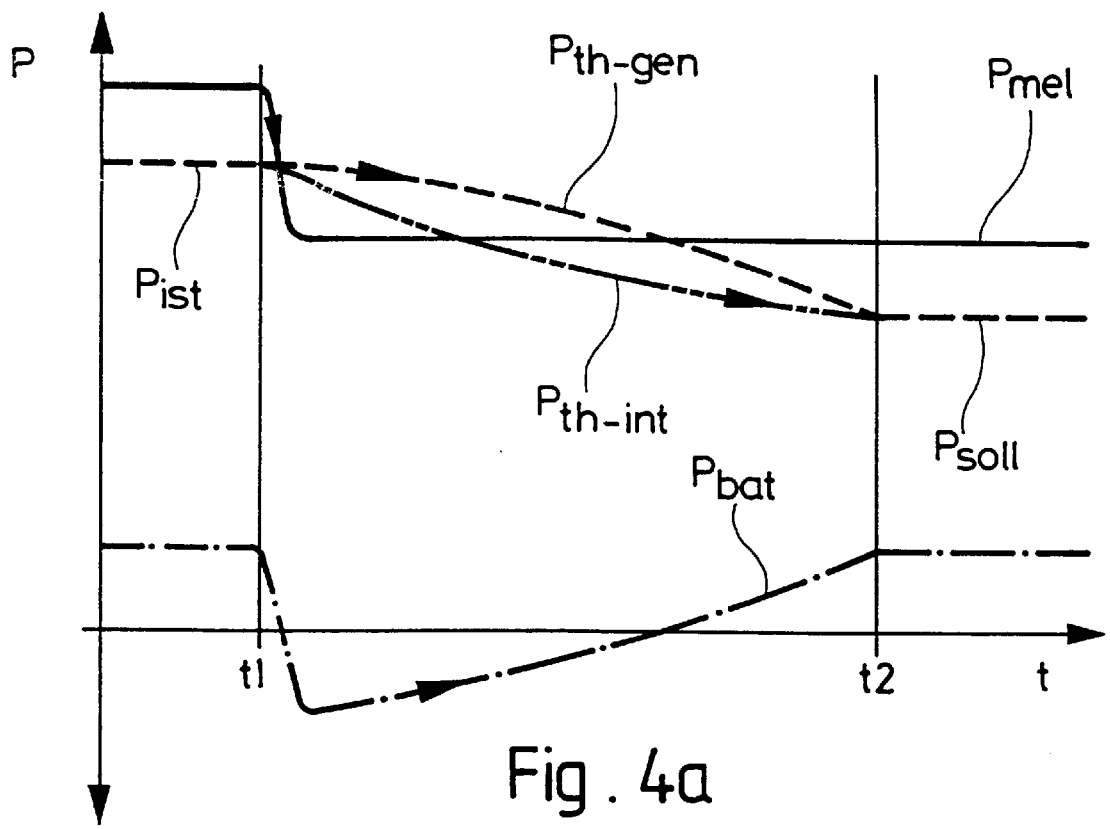
Figure 4B:
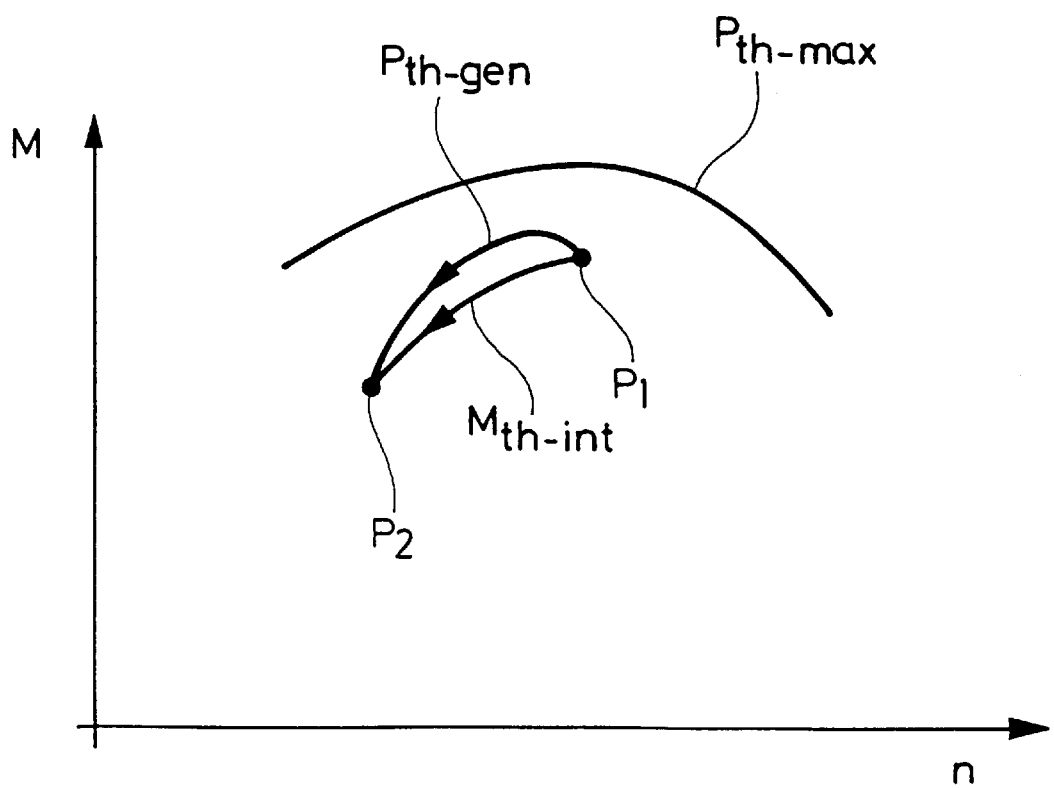

FIGS. 4a and 4b show a third operating example in which in contrast to the first two, the case of a reduction in power of the combustion engine is dealt with.

FIG. 4a shows, after the point in time t1, a relatively sudden reduction of the power Pmel acting on the drive wheels, as is desired with a more or less immediate release of the gas pedal.

Instead of following the power Pth-int produced by the combustion engine 11 along this extreme steeply falling curve Pmel, which again would amount to a detrimental running, by way of a directed application of the battery 20, there can here for example be provided a softly falling power curve Pth-int with optimal conditions. So that a reduction in power actually occurs, analogously to the previous examples, the equilibrium of power of the combustion engine 11 must be lifted for a short time, wherein in the case shown here, the curve of the power Pth-gen delivered by the combustion engine 11 or absorbed by the generator 13 comes to lie above the curve of the internally produced power Pth-int.

According to the course of the battery power Pbat of FIG. 4a, the battery 20 acts as a collecting storage means for the excess produced power which corresponds to the difference Pmel and Pth-gen. Since also in this third example a continual operation of the battery 20 before t1 and after t2 is assumed, this then briefly converts from the discharging condition into the charging condition.

Should excess electrical power occur to the degree that the battery 20, for taking up this power, must exceed the maximum allowable charging current, the component of power which cannot be absorbed is led away via an additionally provided resistance.

Thus the solution according to the invention allows optimal operating conditions of the combustion engine 11 also with a decrease in the driving power or the power of the latter.

Moreover in all three examples, a continual application of the battery 20 is assumed so that there results a clearer presentation, and so that the curves Pmel and Pth-gen up to the point in time t1 and from t2 do not overlap. Of course as a matter of principle, the battery 20 up to the point in time t1 and from t2 may also not deliver any energy, in other words not function as a constant load energy source, or it may even be charged by the generator 13. It is decisive that the battery 20 during the increase or reduction in power of the combustion engine 11 delivers or absorbs energy in order to permit the combustion engine to always function at the selected operating points.

In the following, the application of the battery is gone into in more detail. From FIG. 2a it can be clearly seen that the power curve Pth-gen may fall between the points in time t1 and t2, since the battery provides for the corresponding replacement of power. Since the battery, in the example shown, is situated in the discharging condition before the point in time t1, its delivery of energy must be accordingly effected in a greater measure between t1 and t2.

Of course other operating modes of the battery are also conceivable. For example up to the point in time t1 and after t2 a heaving charging of the battery may be provided for. During the interval lying therebetween the charging is to be effected to a lesser degree. In the extreme case, during this, the discharging mode may be switched to.

In other words this means that the graph of the battery power Pbat may be displaced vertically, be it in the form according to FIGS. 2a, 3a, 4a or otherwise.

The same considerations are of course applicable in the case of a reduction in the power or rotational speed of the combustion engine.

Referring to the third example, FIG. 4a is referred to. Since here the battery was already in the discharging condition before the point in time t1, the delivery of energy between t1 and t2 must be reduced accordingly. This reduction may assume that degree shown in FIG. 4a so that it must possibly be passed over into the charging condition briefly.

On the other hand, for the case in which up to the point in time t1 a heavy charging of the battery was in process, between t1 and t2, only an even more pronounced charging may be effected so that the course of the power Pth-gen delivered by the combustion engine again turns out favorable for the operation.

Also in the case of a reduction in the power or rotational speed of the combustion engine, the graph of the battery power Pbat may be displaced vertically.

It may also be useful that the power of the combustion engine does not increase to the measure of the operation of the gas pedal. For example, the power of the combustion engine may be increased by 20% even though a 10% or 30% increase in the driving power is demanded, so that unsuitable operating regions may be avoided.

By way of the solution according to the invention a complete or a measured relieving of the combustion engine during the starting procedure at a standstill or during the journey may be carried out.

Basically there are various possibilities for adapting the power or rotational speed of the combustion engine:

One possibility lies in the sequential change of the operating parameters and then of the generator, i.e. for example firstly the throttle valve opening, the generator current and again the throttle valve opening may be changed.

A further possibility lies in simultaneously changing the operating parameters of the combustion engine and the generator.

A further solution, which is simple and efficient, consists of keeping the throttle valve of the combustion engine completely open whilst the power or rotational speed of the combustion engine is controlled only via the generator acting as a load. In this manner even a throttle valve may be omitted and possibly only one throttle operating as a noncontinuous protective device is provided.

The solution according to the invention, as already mentioned, is equally suitable for parallel hybrid vehicles. Analogously to series hybrid vehicles in which the current from the generator and the current from the battery are added, with a parallel hybrid vehicle an addition of the power may be effected via the torques. On the one hand, via the mechanical drive line consisting of the combustion engine, the clutch, the gear and the differential gear, a torque is transmitted to the driving wheels, and on the other hand the torque of the electrical motor fed by the battery likewise acts on the driving wheels. The situation shown in FIGS. 2a/2b, 3a/3b and 4a/4b may thus be applied to parallel hybrid vehicles or combination types.

In the case of a reduction of the power or rotational speed of the combustion engine, with regard to the invention, of a parallel hybrid vehicle which is not shown here, the drive motors function as generators and take up the excess power produced by the combustion engine and transmit this further to the battery.

The solution according to the invention is in particular provided when there are significant differences between nominal and actual power or between nominal and actual rotational speeds. With a very slight difference its application may possibly be done away with. It is again the vehicle management unit which decides whether and how the battery is to be applied. Of course at the same time, the charged condition as well as the optimal operation of the battery with respect to its working life is taken account of.

For the purpose of maintaining optimal operating conditions it may be useful, also in the case that no change in power is to be carried out, to apply the electrical energy storer for displacing the operating point of the combustion engine. During a brief relieving of the combustion engine, with an almost constant power, by increasing the rotational speed and reducing the torque, i.e. reducing the throttle valve angle, or by lowering the rotational speed and increasing the torque, again a more favorable operating point with regard to energy consumption, emission of pollutants, noise formation and care of the engine may be achieved. The inventive solution is also for this case advantageous in the same manner, i.e. also with a change in rotational speed with a constant power of the combustion engine.

The method according to the invention permits a swift, and an optimal change in the power and/or rotational speed of the combustion engine with regard to energy consumption, pollutant emission, noise emission, care of the engine and/or any further requirements.

What is claimed is:

1. A series hybrid vehicle comprising:
    an internal combustion engine for producing a mechanical power, means for changing an operating state of the internal combustion engine, a first electrical machine having a mechanical connection to at least one driving wheel for transmitting mechanical power, an electrical energy storer having an electrical connection to the first electrical machine for transmitting electrical power, and a second electrical machine which has a mechanical drive connection to the internal combustion engine and is operable as a generator to convert the mechanical power delivered by the internal combustion engine into electrical power;
    wherein the course of power transmitted via the mechanical connection immediately follows an instruction, and the electrical energy storer, functioning as an intermediate storer, at least occasionally during the change of operating state of the internal combustion engine delivers or absorbs power; and
        wherein the internal combustion engine, during the change in operating state, is guided through certain selected operating points on an internal combustion engine characteristic curve which, with regard to at least one operating parameter selected from minimal energy consumption, minimal emission of pollutants, minimal noise formation and best possible care of the engine, are optimal, or which permit a rapid increase in rotational speed of the internal combustion engine, independently of the course of the mechanical power transmitted via the mechanical connection such that there is a complete decoupling of the driving wheel(s) from the internal combustion engine with regard to power during the change in operating state of the internal combustion engine.

2. An apparatus according to claim 1, wherein the internal combustion engine is a petrol engine operated with a throttle valve of said engine kept completely open.

3. A parallel hybrid vehicle comprising:
    an internal combustion engine for producing a mechanical power, means for changing an operating state of the internal combustion engine, a first electrical machine having a mechanical connection to at least one driving wheel for transmitting mechanical power, and an electrical energy storer having an electrical connection to the first electrical machine for transmitting electrical power;
        wherein the internal combustion engine has a mechanical drive connection to at least one driving wheel;
            wherein the course of power transmitted via the mechanical connection immediately follows an instruction, and the electrical energy storer, functioning as an intermediate storer, at least occasionally during the change of operating state of the internal combustion engine delivers or absorbs power; and
        wherein the internal combustion engine, during the change in operating state, is guided through certain selected operating points on an internal combustion engine characteristic curve which, with regard to at least one operating parameter selected from minimal energy consumption, minimal emission of pollutants, minimal noise formation and best possible care of the engine, are optimal, or which permit a rapid increase in rotational speed of the internal combustion engine, independently of the course of the mechanical power transmitted via the mechanical connection such that there is a complete decoupling of the driving wheel(s) from the internal combustion engine with regard to power during the change in operating state of the internal combustion engine.

4. An apparatus according to claim 3, wherein the internal combustion engine is a petrol engine operated with a throttle valve of said engine kept completely open.

5. A method for changing an operating state of an internal combustion engine of a hybrid vehicle having means for changing the operating state of the internal combustion engine, at least one electrical machine having a mechanical connection for transmitting mechanical power to at least one driving wheel, and an electrical energy storer having an electrical connection for transmitting electrical power to the electrical machine, said method comprising:
    transmitting a course of mechanical power via the mechanical connection immediately following an instruction;
    causing the electrical energy storer, functioning as an intermediate storer, to deliver or absorb power at least occasionally during the change of operating state of the internal combustion engine; and,
    guiding the internal combustion engine, during the change in operating state, through certain selected operating points on an internal combustion engine characteristic curve which, with regard to at least one operating parameter selected from minimal energy consumption, minimal emission of pollutants, minimal noise formation and best possible care of the engine, are optimal, or which permit a rapid increase in rotational speed of the internal combustion engine, independently of the course of the mechanical power transmitted via the mechanical connection such that there is a complete decoupling of the driving wheel(s) from the internal combustion engine with regard to power during the change in operating state of the internal combustion engine.

6. A method according to claim 5, wherein the change in operating state comprises a change in rotational speed of the internal combustion engine.

7. A method according to claim 6, wherein the change in operating state takes place within a time interval, at the beginning of which there is an actual operating state with an actual rotational speed value and at whose end a nominal operating state with a nominal rotational speed is to be attained.

8. A method according to claim 7, wherein the change in operating state comprises an increase in rotational speed of the internal combustion engine, and wherein the electrical energy storer at least occasionally during a time interval, in comparison to the point in time of the actual operating state and in comparison to the point in time of the nominal operating state, is more intensively discharged or less intensively charged.

9. A method according to claim 7, wherein the change in operating state comprises a decrease in rotational speed of the internal combustion engine, and wherein the electrical energy storer at least occasionally during a time interval, in comparison to the point in time of the actual operating state and in comparison to the point in time of the nominal operating state, is less intensively discharged or more intensively charged.

10. A method according to claims 5, wherein the internal combustion engine is a petrol engine operated with a throttle valve of said engine kept completely open.

\* \* \* \* \*